United States Patent [19]

Shintani

[11] Patent Number: 4,793,055

[45] Date of Patent: Dec. 27, 1988

[54] ASSEMBLY LINE ARRANGEMENT FOR PRODUCING VEHICLES

[75] Inventor: Katsuhiro Shintani, Hiroshima, Japan

[73] Assignee: Mazda Motor Corporation, Japan

[21] Appl. No.: 924,218

[22] Filed: Oct. 28, 1986

[30] Foreign Application Priority Data

Oct. 29, 1985 [JP] Japan .................. 60-242010

[51] Int. Cl.$^4$ .............................. B23P 21/00
[52] U.S. Cl. ....................... 29/786; 29/793; 29/794
[58] Field of Search .............. 29/783, 786, 793, 794, 29/787, 788, 789, 790, 791, 795, 796, 797, 822, 823; 198/447, 465.4

[56] References Cited

U.S. PATENT DOCUMENTS

| | | | |
|---|---|---|---|
| 405,088 | 6/1889 | Ferguson | 198/447 X |
| 618,396 | 4/1899 | Cowles | 198/465.4 X |
| 2,757,447 | 8/1956 | Barenyi | 29/794 X |
| 2,959,269 | 11/1960 | Kammerer | 198/447 X |
| 3,344,503 | 10/1967 | Merritt | 29/794 X |
| 4,685,208 | 8/1987 | Sekiratu | 29/786 |

FOREIGN PATENT DOCUMENTS

59-57075 4/1984 Japan .
538884 12/1985 Japan .

*Primary Examiner*—P. W. Echols
*Assistant Examiner*—Andrew E. Rawlins
*Attorney, Agent, or Firm*—Gerald J. Ferguson, Jr.

[57] ABSTRACT

An assembly line arrangement for producing a vehicle comprises a body assembly line including a door removing station for detaching at least one door from a vehicle body fed thereto with the door, a door mounting station located at the lower course of the line compared with the door removing station for attaching the door fed thereto to the vehicle body from which the door is detached, and a body conveying device for transporting the vehicle body through the door removing station and the door mounting station successively; and a door subassembly line including a door equipping station located in the vicinity of the door mounting station for equipping the door detached from the vehicle body with door parts, and a door conveying device for transporting the door detached from the vehicle body at the door removing station to the door equipping station and further transporting the door equipped with the door parts at the door equipping station to the door mounting station.

1 Claim, 1 Drawing Sheet

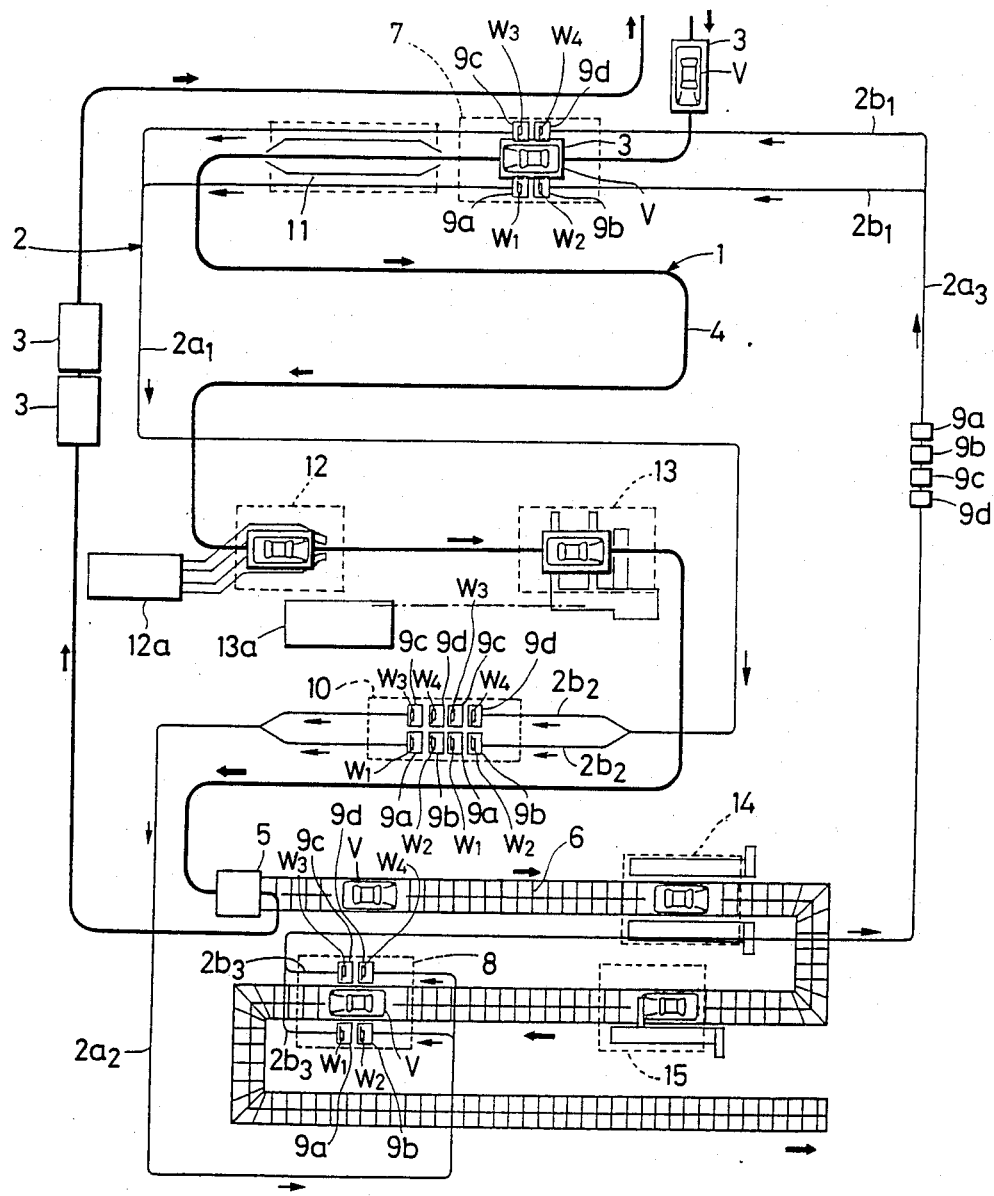

ASSEMBLY LINE ARRANGEMENT FOR PRODUCING VEHICLES

BACKGROUND OF THE INVENTION

1. Field of the Invention

The present invention relates generally to assembly line arrangements for producing vehicles, and more particularly, is directed &o an improvement in an arrangement for a vehicle assembly line in which a vehicle body is conveyed to be provided with various parts mounted thereon.

2. Discription of the Prior Art

There has been previously proposed a vehicle assembly line arrangement including a body assembly line in which a vehicle body fed thereinto with doors after having passed through a coating process is conveyed to be subjected to a body assembling process and a door subassembly line, formed into an individual circular assembly line, in which the doors detached from the vehicle body on the body assembly line are conveyed to be subjected to a door assembling process, as disclosed in, for example, the Japanese patent application published before examination under the publication No. 59/57075 on Apr. 2, 1984. In such a vehicle assembly line arrangement proposed previously, each of the doors accompanying the vehicle body fed into the body assembly line is detached from the vehicle body at a door removing station located in the body assembly line and guided to the door subassembly line in which various door parts are mounted on the door, and then each door provided fully with the door parts is transferred from the door subassembly line to a door mounting station located in the body assembly line to be mounted to the corresponding vehicle body without the doors, which is provided with various body parts during its movement along the body assembly line. The door subassembly line is provided with a door conveying device which is usually formed into an overhead conveyor comprising an overhead circular rail and a plurality of door hangers each engaged with the overhead circular rail. Each of the door hangers moves to circulate along the overhead circular rail and holds the door detached from the vehicle body at the door removing station in the body assembly line so as to transport the same along the door subassembly line from the door removing station to the door mounting station.

In the case of the arrangement mentioned above, the door removing station and the door mounting station are located to have a predetermined relatively long distance therebetween so that the vehicle body is able to be provided fully with the body parts during its movement along the body assembly line from the door removing station to the door mounting station. In connection with this, it is required for the door conveying device in the door subassembly line to have a relatively long distance between a portion thereof positioned at the door removing station and another portion thereof positioned at the door mounting station, so that the time lapsed during the movement of the door made along the door subassembly line from the door removing station to the door mounting station is equal to the time lapsed during the movement of the vehicle body made along the body assembly line from the door removing station to the door mounting station.

Under such a situation, since the time lapsed during an actual door parts mounting period in which each door is provided fully with the door parts in practice after being detached from the vehicle body is relatively shorter than the time lapsed during the movement of the door made along the door subassembly line from the door removing station to the door mounting station, many doors provided fully with the door parts are to be conveyed slowly toward the door mounting station by the door conveying device especially at the rear half of the door subassembly line. Accordingly, the door conveying device is required to have a large number of door hangers and the overhead circular rail by which the door hangers are supported is burdened with a very heavy load, and consequently the overhead circular rail, a housing structure supporting the overhead circular rail and other members constituting the door conveying device are necessitated to be constructed firmly enough. This results in a problem that the expense of facilities are considerably increased, and also in a disadvantage that the door hangers increased in number make noise of large magnitude.

In this connection, in comparison with the weight of the door without the door parts, the weight of the door provided fully with the door parts is increased by, for example, about seventy-five percent, such as to thirty five kilograms from twenty kilograms.

OBJECTS AND SUMMARY OF THE INVENTION

Accordingly, it is an object of the present invention to provide an assembly line arrangement for producing a vehicle which avoids the foregoing problems encountered with the prior art.

Another object of the present invention is to provide an assembly line arrangement for producing a vehicle which includes a body assembly line in which a vehicle body fed thereto with at least one door is conveyed to be subjected to a body assembling process and a door subassembly line in which a door detached from the vehicle body in the body assembly line and fed thereinto is conveyed by a door conveying device to be subjected to a door assembling process, and in which the door conveying device provided in the door subassembly line is improved in durability and the expenses of facilities can be reduced.

A further object of the present invention is to provide an assembly line arrangement for producing a vehicle which includes a body assembly line in which a vehicle body fed thereto with at least one door is conveyed to be subjected to a body assembling process and a door subassembly line in which a door detached from the vehicle body in the body assembly line and fed thereinto is conveyed by a door conveying device to be subjected to a door assembling process, and in which the door conveying device provided in the door subassembly line is prevented from being burdened with an undesirably heavy load.

A still further object of the present invention is to provide an assembly line arrangement of producing a vehicle which includes a body assembly line in which a vehicle body fed thereto with at least one door is conveyed to be subjected to a body assembling process through a door removing station and a door mounting station provided therein and a door subassembly line in which a door detached from the vehicle body at the door removing station in the body assembly line and fed thereto is subjected to a door assembling process and conveyed toward the door mounting station in the body assembly line, and in which the length of a transferring portion of the door subassembly line along which the door equipped with door parts through the door assembling process is conveyed toward the door mounting station is arranged to be relatively short so that the number of the doors equipped with the door parts within the transferring portion of the door subassembly line is reduced.

According to the present invention, there is provided an assembly line arrangement for producing a vehicle, which comprises a body assembly line including a door removing station for detaching at least one door from a vehicle body fed thereto with the door, a door mounting station located at the lower course of the line compared with the door removing station for attaching the door fed thereto to the vehicle body from which the door is detached at the door removing station, and a body conveying device for transporting the vehicle body through the door removing station and the door mounting station successively; and a door subassembly line including a door equipping station located in the vicinity of the door mounting station fed equipping the door detached from the vehicle body at the door removing station and fed thereto with door parts, and a door conveying device for transporting the door detached from the vehicle body at the door removing station to the door equipping station and further transporting the door equipped with the door parts at the door equipping station to the door mounting station.

In the assembly line arrangement thus constituted in accordance with the present invention, the door detached from the vehicle body at the door removing station in the body assembly line is conveyed by the door conveying device to the door equipping station in the door subassembly line and equipped with the door parts at the door equipping station, and then the door provided with the door parts is further conveyed by the door conveying device from the door equipping station to the door mounting station located at the lower course of the body assembly line compared with the door removing station and attached to the vehicle body from which the door is detached at the door removing station at the door mounting station. The door equipping station in the door subassembly line is located in vicinity of the door mounting station in the body assembly line so that the distance along the door subassembly line between the door equipping station and the door mounting station is made relatively short, and therefore the door equipped with the door parts is transported to the door mounting station through the relatively short distance from the door equipped station. Accordingly, the number of the doors equipped with the door parts and transported by the door conveying device successively in a line along the door assembly line is reduced and consequently the door conveying device is prevented from being burdened with a undesirably heavy load. This results in that the door conveying device is improved in durability and the expenses of facilities including the door conveying device can be reduced.

The above, and other objects, features and advantages of the present invention will become apparent from the following detailed description which is to be read in conjunction with the accompanying drawing.

BRIEF DESCRIPTION OF THE DRAWING

The sole figure of the accompanying drawing is a schematic plane view showing an embodiment of assembly line arrangement for producing a vehicle according to the present invention.

DESCRIPTION OF THE PREFERRED EMBODIMENT

Now, the invention will be described by way of example with reference to the sole figure of the accompanying drawing, which shows schematically one embodiment of an assembly line arrangement for producing a vehicle according to the present invention.

In the embodiment shown in the figure, a body assembly line 1 in which vehicle bodies V fed thereto after having passe through a coating process are conveyed is provided to meander to extend over a relatively long distance and a door subassembly line 2 is also provided in the form of a circular assembly line.

At the upper course of the body assembly line 1, a door removing station $7_7$ at which left doors $W_1$ and $W_2$ and right doors $W_3$ and $W_4$ mounted respectively on the left and right sides of each vehicle body V ar detached from the vehicle body V in the body assembly line 1, is located to receive the vehicle bodies V from a station of the coating process. On the other hand, at the lower course of the body assembly line 1, a door mounting station 8 at which the left doors $W_1$ and $W_2$ and the right doors $W_3$ and $W_4$ detached respectively from the left and right sides of each vehicle body V at the door removing station 7 and having passed through the door subassembly line 2 are attached to the right and left sides of the corresponding vehicle body V is located.

In the body assembly line 1 thus provided with the door removing station 7 and the door mounting station 8, a body hanger conveyor 4 having a plurality of body hangers 3 for holding respectively the vehicle bodies V is installed for transporting the vehicle bodies V through the door removing station 7 to an interconnecting position close to the door mounting station 8 along the body assembly line 1, and a slat conveyor 6 provided with a lifter 5 at the interconnecting position close to the door mounting station 8 is also installed for further transporting the vehicle bodies V, which are transported to the interconnecting position by the body hanger conveyor 4 and received by the lifter 5, through the door mounting station 8 along the body assembly line 1. The body hanger conveyor 4 is operative to return the body hangers 3 emptied by transferring the respective vehicle bodies V to the lifter 5 to partitions of preceding processes.

Besides, the body assembly line 1 is provided with several other zones or stations for equipping each of the vehicle bodies V with various body parts between the door removing station 7 and the door mounting station 8. For example, as shown in the figure, a tilting zone 11 where the vehicle body V is tilted to be equipped with various parts under a floor panel thereof, a tire mounting station 12 where four tires which are supplied from a tire repository 12a are attached to respective axles provided to the vehicle body V and a spare tire which is also supplied from the tire repository 12a is loaded on vehicle body V, and an engine and suspension mounting station 13 where an engine and front and rear suspension units which are supplied from an engine and suspension repository 13a are mounted to the vehicle body V, are located successively at appropriately spaced intervals along the body hanger conveyor 4, and further a windshield installing station 14 where front and rear windshields are installed on the vehicle body V and a fluid filling station 15 where some kinds of fluid including gasoline are filled in respective tanks or reservoirs attached to the vehicle body V, are also located successively at appropriately spaced intervals along the slat conveyor 6.

Meanwhile, in the door subassembly line 2, a door equipping station 10 at which each of the left doors $W_1$ and $W_2$ and the right doors $W_3$ and $W_4$ fed thereto is equipped with various door parts is located in the vicinity of the door mounting station 8 in the body assembly line 1, and a circular door hanger conveyor which is composed of first, second and third single-track portions $2a_1$, $2a_2$ and $2a_3$ each comprising a couple of gathering partial door conveyers, a first double-track portion comprising a pair of parallel door conveying branches $2b_1$, a second double-track portion comprising a pair of parallel door conveying branches $2b_2$ and a third double-track portion comprising a pair of parallel door conveying branches $2b_3$, is installed for transporting the left doors $W_1$ and $W_2$ and the right doors $W_3$ and $W_4$ detached from each vehicle body V at the door removing station 7 in the body assembly line 1 to the door equipping station 10 and then further transporting the left doors $W_1$ and $W_2$ and the right doors $W_3$ and $W_4$ each equipped with the door parts at the door equipping station 10 to the door mounting station 8 in the body assembly line 1.

Each of the first, second and third single-track portion $2a_1$, $2a_2$ and $2a_3$ has a plurality of groups of four door hangers 9a, 9b, 9c and 9d for holding the left doors $W_1$ and $W_2$ and the right doors $W_3$ and $W_4$, respectively. Further, each of one of the parallel door conveying branches $2b_1$, one of the parallel door conveying branches $2b_2$ and one of the parallel door conveying branches $2b_3$ has a plurality of pairs of door hangers 9a and 9b for holding the left doors $W_1$ and $W_2$, respectively, and each of the other of the parallel door conveying branches $2b_1$, the other of the parallel door conveying branches $2b_2$ and the other of the parallel door conveying branches $2b_3$ has a plurality of pairs of door hangers 9c and 9d for holding the right doors $W_3$ and $W_4$, respectively.

The parallel door conveying branches $2b_1$ are arranged to pass through the door removing station 7, and at the door removing station 7, one of the parallel door conveying branches $2b_1$ receives the left doors $W_1$ and $W_2$ with the door hangers 9a and 9b and the other of the parallel door conveying branches $2b_1$ receives the right doors $W_3$ and $W_4$ with the door hangers 9c and 9d. The parallel door conveying branches $2b_2$ are arranged to pass through the door equipping station 10, and at the door equipping station 10, one of the parallel door conveying branches $2b_2$ holds the left doors $W_1$ and $W_2$ with the door hangers 9a and 9b and the other of the parallel door conveying branches $2b_2$ holds the right doors $W_3$ and $W_4$ with the door hangers 9c and 9d. Further, the parallel door conveying branches $2b_3$ are arranged to pass through the door mounting station 8, and at the door mounting station 8, one of the parallel door conveying branches $2b_3$ transfers the left doors $W_1$ and $W_2$ to the left side of the vehicle body V from the door hangers 9a and 9b and the other of the parallel door conveying branches $2b_3$ transfers the right doors $W_3$ and $W_4$ to the right side of the vehicle body V from the door hangers 9c and 9d.

On the other hand, the first single-track portion $2a_1$ connects therethrough the parallel door conveying branches $2b_1$ with the parallel door conveyor branches $2b_2$ and transports the left doors $W_1$ and $W_2$ and the right doors $W_3$ and $W_4$ detached from the vehicle body V at the door removing station 7 and held respectively by the door hangers 9a, 9b, 9c and 9d in series. The second single-track portion $2a_2$ connects therethrough the parallel door conveying branches $2b_2$ with the parallel door conveying branches $2b_3$ and transports the left doors $W_1$ and $W_2$ and the right doors $W_3$ and $W_4$ each equipped with the door parts at the door equipping station 10 and help respectively by the door hangers 9a, 9b, 9c and 9d in series. Further, the third single-track portion $2a_3$ connects therethrough the parallel door conveying branches $2b_3$ with the parallel door conveying branches $2b_1$ without transporting any door.

In the embodiment thus constituted, each of the vehicle bodies V brought in the body assembly line 1 with the left doors $W_1$ and $W_2$ and the right doors $W_3$ and $W_4$ is held by the body hanger 3 of the body hanger conveyor 4 and transported by the door hanger conveyer 4 to the body removing station 7. At the door removing station 7, the left doors $W_1$ and $W_2$ and the right doors $W_3$ and $W_4$ are detached from the right and left sides of the vehicle body V, respectively. Then, the vehicle body V without the left doors $W_1$ and $W_2$ and the right doors $W_3$ and $W_4$ is further transported by the body hanger conveyor 4 from the door removing station 7 through the tilting zone 11, the tire mounting station 12, the engine and suspension mounting station 13 to the interconnecting position along the body assembly line 1. At the interconnecting position in the body assembly line 1, the vehicle body V without the left doors $W_1$ and $W_2$ and the right doors $W_3$ and $W_4$ is transferred through the lifter 5 to the slat conveyor 6. After that, the vehicle body V without the left doors $W_1$ and $W_2$ and the right doors $W_3$ and $W_4$ is transported by the slat conveyor 6 through the windshield installing station 14 and the fluid filling station 15 to the door mounting station 8 along the body assembly line 1. Through such successive transportation by the body hanger conveyor 4 and the slat conveyer 6, the vehicle body V without the left doors $W_1$ and $W_2$ and the right doors $W_3$ and $W_4$ is equipped with various body parts and other necessaries at each of the zones and stations including those described above, so that the vehicle body V provided with the body parts and other necessaries is fed to the door mounting station 8.

Incidentally, the body hangers 3 emptied after having transferred the vehicle bodies V to the lifter 5 are returned to the partitions of preceding processes by the body hanger conveyor 4.

On the other hand, the left doors $W_1$ and $W_2$ and the right doors $W_3$ and $W_4$ detached from the vehicle body V at the door removing station 7 are transferred to he door subassembly line 2 in such a manner as to be transported by the circular door hanger conveyor which is composed of the first, second and third single-track portions $2a_1$, $2a_2$ and $2a_3$, the first double-track portion comprising a pair of parallel door conveying branches $2b_1$, the second double-track portion comprising a pair of parallel door conveying branches $2b_2$ and the third double-track portion comprising a pair of parallel door conveying branches $2b_3$. At the door removing station 7, the door hangers 9a, 9b, 9c and 9d conveyed thereto through the third single-track portion $2a_3$ are divided into two groups, one of which is consists of the door hangers 9a and 9b and the other of which is consists of the door hangers 9c and 9d so as to be conveyed through the parallel door conveying branches $2b_1$, respectively. The left doors $W_1$ and $W_2$ which are detached from the left side on the vehicle body V are held respectively by the door hangers 9a and 9b and transported by one of the parallel door conveying branches $2b_1$, and the right doors $W_3$ and $W_4$ which are detached from the right side on the vehicle body V are held respectively by the door hangers $9c$ and $9d$ and transported by the other of the parallel door conveying branches $2b_1$.

Then, the left doors $W_1$ and $W_2$ held by the door hangers $9a$ and $9b$ and the right doors $W_3$ and $W_4$ held by the door hangers $9c$ and $9d$ are transferred from the parallel door conveying branches $2b_1$ to the first single-track portion $2a_1$ and conveyed in series by the latter to the parallel door conveying branches $2b_2$. The parallel door conveying branches $2b_2$ feed the left doors $W_1$ and $W_2$ held by the door hangers $9a$ and $9b$ and the right doors $W_3$ and $W_4$ held by the door hangers $9c$ and $9d$ separately to the door equipping station 10. In such a manner, the left doors $W_1$ and $W_2$ and the right doors $W_3$ and $W_4$ detached from the vehicle body V at the door removing station 7 are transported to the door equipping station 10 by a first portion of the circular door hanger conveyor.

Each of the left doors $W_1$ and $W_2$ and the right doors $W_3$ and $W_4$ thus transported to the door equipping station 10 is conveyed by the parallel door conveying branches $2b_2$ in the door equipping station 10 and equipped with the door parts thereat. After that, the left doors $W_1$ and $W_2$ held respectively by the door hangers $9a$ and $9b$ and the right doors $W_3$ wnd $W_4$ held respectively by the door hangers $9c$ and $9d$, each of which is equipped with the door parts, are transferred fro the parallel door conveying branches $2b_2$ to the second single-track portion $2a_2$ and conveyed in series by the latter to the parallel door conveying branches $2b_3$. The parallel door conveying branches $2b_3$ feed the left doors $W_1$ and $W_2$ held by the door hangers $9a$ and $9b$ and the right doors $W_3$ and $W_4$ held by the door hangers $9c$ and $9d$ separately to the door mounting station 8, so that the left doors $W_1$ and $W_2$ and the right doors $W_3$ and $W_4$ each equipped with the door parts are transported to the door mounting station 8 by a second portion of the circular door hanger conveyor.

At the door mounting station, the left doors $W_1$ and $W_2$ and the right doors $W_3$ and $W_4$ each equipped with the door parts and transported thereto in such a manner as described above are transferred from the respective door hangers $9a$, $9b$, $9c$ and $9d$ and attached respectively to the left and right sides of the vehicle body V which is equipped with the body parts and other necessaries and transported thereto by the slat conveyor 6 in the body assembly line 1. Then, the vehicle body V provided with the left doors $W_1$ and $W_2$ and the right doors $W_3$ and $W_4$ is transported by the slat conveyor 6 to a station of next process.

The door hangers $9a$, $9b$, $9c$ and $9d$ emptied after having transferred the left doors $W_1$ and $W_2$ and the right doors $W_3$ and $W_4$ to the vehicle body V are transferred from the parallel door conveying branches $2b_3$ to the third single-track portion $2a_3$ and conveyed in series through the latter to the parallel door conveying branches $2b_1$, so as to be returned to the door removing station 7 through a third portion of the circular door hanger conveyor.

In the embodiment described above, since the door equipping station 10 in the door subassembly line 2 is located in the vicinity of the door mounting station 8 in the body assembly line 1 and therefore the distance along the door subassembly line 2 from the door equipping station 10 to the door mounting station 8 is made relatively short, the number of the door hangers $9a$, $9b$, $9c$ and $9d$ holding respectively the left doors $W_1$ and $W_2$ and the right doors $W_3$ and $W_4$ each equipped with the door parts and being conveyed through the second portion of the circular door hanger conveyor successively in a line between the door equipping station 10 and the door mounting station 8 is reduced and consequently the circular door hanger conveyor is prevented from being burdened with a undesirably heavy load composed of the left doors $W_1$ and $W_2$ and the right doors $W_3$ and $W_4$ equipped with the door parts. This results in that the circular door hanger conveyor is improved in durability and the expenses of facilities including the circular door hanger conveyor can be reduced.

What is claimed is:

1. An assembly line arrangement for producing a vehicle comprising:

body assembly line means including a door removing station for detaching at least one door from a vehicle body fed thereto with the door, a door mounting station located at the lower course of the body assembly line means compared with said door removing station for attaching the door fed thereto to the vehicle body from which the door is detached at said door removing station, and a body conveying device for transporting the vehicle body through said door removing station and said door mounting station successively, and door assembly line means including a door equipping station so located with respect to said door mounting station that the distance between the door equipping station and the door mounting station is short relative to the distance between the door equipping station and the door removing station for equipping the door detached from the vehicle body at said door removing station and fed thereto with door parts, and a door conveying device for transporting doors detached from the vehicle body at said door removing station to and through said door equipping station and for transporting doors equipped with the door parts at said door equipping station to said door mounting station, wherein at least a pair of right and left doors are detached from right and left sides of the vehicle body, respectively, at said door removing station, wherein said door conveying device includes a double-track portion comprising a pair of door conveying branches which extend in parallel at said door removing station, said door equipping station and said door mounting station, a first single-track portion extending between said door removing and said door equipping station and a second single-track portion extending between said door equipping station and said door mounting station, wherein left and right doors are gathered together on the first single-track portion after passing through said door removing station and then separated and respectively directed onto left door and right door branches of the double-track portion at said door equipping station, and wherein left and right doors are gathered together on said second single-track portion after passing through said door equipping station and the separated and respectively directed onto left door and right door branches of the double-track portion at said door mounting station.

* * * * *